Figure 1:
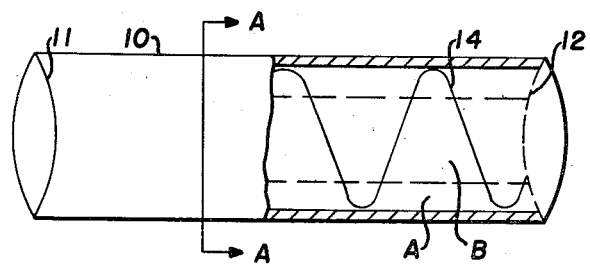
Figure 2:
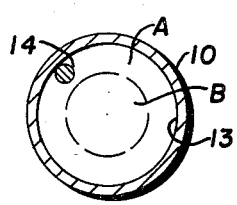

May 6, 1958     J. P. LONGWELL     2,833,840
PROCESS FOR CONTACTING IMMISCIBLE LIQUIDS
Filed June 21, 1954

John P. Longwell     Inventor

By W. N. Wright     Attorney

United States Patent Office 2,833,840
Patented May 6, 1958

2,833,840
PROCESS FOR CONTACTING IMMISCIBLE LIQUIDS

John P. Longwell, Westfield, N. J., assignor to Esso Research and Engineering Company, a corporation of Delaware Application June 21, 1954, Serial No. 437,911

2 Claims. (Cl. 260—683.59)

This invention relates to a method of contacting two immiscible liquids having different specific gravities in order to insure more efficient contact therebetween, and to apparatus for carrying out such a process, and more particularly to a method of contacting such liquids wherein a major amount of light is to be contacted with a minor amount of relatively heavy liquid.

In the past, numerous procedures and devices have been suggested for the contacting of immiscible liquids between which there is to be a chemical reaction or in a solvent extraction process. Such devices include so-called "mixing orifices" and other means for providing turbulence in mixtures of immiscible liquids or for providing turbulence in the components of such a mixture prior to contacting them. The method and apparatus of the present invention provide for more efficient mixing of immiscible liquids than is provided by conventional orifice mixers, and is particularly adapted for use in the treating of hydrocarbons with caustic or with acid, where the volume of the heavy acid or caustic component is relatively small compared to that of the lighter hydrocarbon liquid. In such cases it is generally desirable for the heavy material to pass through the contacting system slowly as compared to the light material, at the same time providing good contact along the entire length of the contacting zone, which is often in the form of a cylindrical pipe. In addition, conventional orifice plate contacting systems have a tendency to form emulsions which must be broken later. The method and apparatus of the present invention have a reduced tendency to form such undesirable emulsions.

It is an object of the present invention, therefore, to provide a method for the contacting of two immiscible liquids of different specific gravities in such a way as to provide for substantially improved contact between them.

It is a further object of the present invention to provide a method for contacting two immiscible liquids of different specific gravities in an elongated reaction chamber, such as a pipe, in which the velocity of the heavier material is relatively small compared to that of the lighter material.

It is a still further object of the present invention to provide relatively simple apparatus for contacting two immiscible liquids according to the method of the present invention.

These objects, as well as others which will be in part apparent and in part specifically pointed out in the subsequent description, are attained by providing a process for contacting two immiscible liquids of different specific gravities in an elongated chamber by imparting rotary motion to the two said liquids in a plane substantially perpendicular to the direction of flow of said liquids. By imparting such motion, the denser of the two liquids is thrown outwardly by centrifugal force toward the walls of the chamber, which is generally in the form of a cylindrical pipe, and forms a relatively slow-moving film of heavy material with an inner core of light material moving past it at a more rapid rate.

According to the present invention, such motion is imparted by providing a wire helix carried on the inner wall of the pipe and held there by friction. The helix imparts a rotary motion to the liquid flowing through the pipe and centrifugal force impels the heavier liquid toward the walls of the pipe, forming a relatively slow-moving film as previously mentioned.

The present invention may be better understood by reference to the accompanying drawings, in which:

Figure I is an elevation of a cylindrical pipe, partly broken away, in which the method of the present invention may be carried out; and Figure II is a view in section taken on line A—A of Figure I, illustrating diagrammatically the configuration assumed by the liquids within the pipe as to flow therethrough.

Referring now specifically to the drawings, there is illustrated an elongated pipe 10, through which a mixture of immiscible liquids A and B enter flowing from intake end 11 toward exit end 12. Inside the pipe 10, and carried on the inner surface 13 thereof, is the helix 14, which is made up of a metal wire such as stainless steel, which is inert to the liquids flowing through the pipe and which will not be corroded by nor enter into any chemical reaction with them. The flow of liquid along the axis of the helix 14 imparts a rotary motion to the mixture of liquids A and B, causing the heavy liquid A to form a film next to the inner wall 13 of the pipe and surrounding a more rapidly moving inner core of lighter liquid B, as may be seen in Figure II.

In normal operation it has been found that the ratio of the diameter of the wire making up helix 14 to the inside diameter of pipe 10 should vary between about 0.3 to about 0.5 with a ratio of about 0.1 to 0.2 being most preferred. Ratios larger than this tend to block flow in the pipe, whereas smaller diameter ratios do not impart sufficient rotary motion to cause proper separation of the liquids. The helix should be wound so that there are between about 0.2 and about 2 turns per inside diameter of pipe, with about ½ turn per inside diameter of pipe being the preferred value.

The invention is applicable to any mixture of immiscible liquids having different specific gravities in which there is contained more light liquid than heavy liquid. As the proportion of heavy liquid approaches 50%, it is desirable to use heavier wire in forming the helix. The velocity of the mixture flowing through the pipe can be varied over a very wide range, depending upon the particular mixture employed. Velocities of from 1 to 20 feet per second have been employed successfully. In order that rotary motion be imparted to the liquid by the helix, it is preferred that the velocity of flow be sufficient to produce turbulent rather than streamline flow.

As an example of the operation of the process of the present invention as applied to an alkylation process employing olefins, isoparaffins and sulfuric acid, a ¼" pipe was wound with a helix of 18 gauge wire wound two turns to the inch inside the pipe. A mixture of 30% acid and 70% liquid butene-isobutane mixture was fed into a fifty-foot pipe at the rate of about 60 feet per minute at a temperature of 50° F. In comparing the results obtained from such a run and a similar run using conventional orifice plate mixing, the following results were obtained:

Table I

|  | Orifice Plate Reactor | Wire Helix Reactor |
| --- | --- | --- |
| Yield, Volume Percent on Olefin | 158 | 168 |
| ASTM Octane Number Clear | 90.8 | 92.6 |

Measurement of the rate of travel of a nitrogen bubble through this system showed that the inner core of light olefin travelled five times as fast as the average flow of the liquid, indicating that the sulfuric acid formed a slower moving outer layer, as indicated in the drawings by the heavy liquid A. The improvement in quality of the product obtained, based on its use in aviation fuels, would appreciably enhance the commercial value of the product.

While the present invention has been described with respect to one specific embodiment thereof, it will be understood that the invention is not limited to such a specific embodiment thereof, but only by the scope of the appended claims.

What is claimed is:

1. An improved process for contacting a relatively light liquid with a lesser quantity of a relatively dense liquid immiscible therewith which comprises introducing said liquids into one end of an elongated cylindrical vessel, imparting helical flow to the liquids along the inner wall of said vessel, forming a slow moving film of the heavier liquid adjacent to the vessel wall and a faster moving central stream of the lighter liquid flowing concurrently with said slow moving film, and withdrawing the two streams from the opposite end of said vessel.

2. A process for alkylating olefins with isoparaffins in the presence of sulfuric acid which comprises introducing a mixture of olefins and isoparaffins and a lesser quantity of sulfuric acid into one end of an elongated cylindrical reaction vessel, imparting helical flow to the liquids next to the vessel wall, forming a film of sulphuric acid which slowly moves through said vessel along a helical path and a stream of hydrocarbons which moves through the central portion of said vessel at a faster rate concurrently with said film of sulfuric acid, and withdrawing said hydrocarbons and sulfuric acid from the opposite end of said vessel.

References Cited in the file of this patent

UNITED STATES PATENTS

| | | |
|---|---|---|
| 617,712 | Bell | Jan. 17, 1899 |
| 655,430 | Bell | Aug. 7, 1900 |
| 1,683,766 | Egloff et al. | Sept. 11, 1928 |
| 1,951,647 | Cooke | Mar. 20, 1934 |
| 2,426,611 | Hudson et al | Sept. 2, 1947 |
| 2,460,987 | Kanhofer | Feb. 8, 1949 |
| 2,491,618 | Luetzelschwab | Dec. 20, 1949 |
| 2,661,194 | Katovsich | Dec. 1, 1953 |